(12) United States Patent
Morrow et al.

(10) Patent No.: US 7,591,440 B2
(45) Date of Patent: Sep. 22, 2009

(54) METHODS AND SYSTEMS FOR CEMENT FINISHING MILL CONTROL

(75) Inventors: Alan Morrow, Cumberland, RI (US);
Fayyaz Hussain, Hopkinton, MA (US);
Lewis Gordon, North Attleboro, MA (US); Randy Dwiggins, Somerville, NJ (US)

(73) Assignee: Invensys Systems, Inc., Foxboro, MA (US)

( * ) Notice: Subject to any disclaimer, the term of this patent is extended or adjusted under 35 U.S.C. 154(b) by 643 days.

(21) Appl. No.: 11/204,557

(22) Filed: Aug. 15, 2005

(65) Prior Publication Data

US 2006/0060684 A1    Mar. 23, 2006

Related U.S. Application Data

(60) Provisional application No. 60/601,531, filed on Aug. 13, 2004.

(51) Int. Cl.
| | |
|---|---|
| *B02C 23/02* | (2006.01) |
| *B02C 17/02* | (2006.01) |
| *B02B 1/00* | (2006.01) |
| *B07B 7/00* | (2006.01) |
| *B07B 4/00* | (2006.01) |
| *B07B 9/00* | (2006.01) |
| *C04B 7/52* | (2006.01) |
| *G05B 1/06* | (2006.01) |
| *G05B 13/02* | (2006.01) |
| *G06F 19/00* | (2006.01) |
| *G01N 37/00* | (2006.01) |

(52) U.S. Cl. ............ 241/171; 241/24.1; 241/34; 241/52; 106/756; 106/757; 318/638; 700/44; 700/109; 702/81

(58) Field of Classification Search ............ 700/29, 700/37, 44, 159, 160; 702/81, 82, 84; 318/638, 318/639; 241/24.1, 24.12, 25, 33, 34, 52, 241/170, 171; 106/713, 739, 756, 757
See application file for complete search history.

(56) References Cited

U.S. PATENT DOCUMENTS

| | | | | |
|---|---|---|---|---|
| 3,784,115 A | * | 1/1974 | Krijger et al. | 241/30 |
| 3,856,214 A | * | 12/1974 | Kaltenbach et al. | 241/34 |
| 3,949,940 A | * | 4/1976 | Horning | 241/30 |
| 4,341,352 A | * | 7/1982 | Liller | 241/21 |
| 4,611,763 A | * | 9/1986 | Tomiyasu et al. | 241/30 |
| 5,519,298 A | * | 5/1996 | Fukuhara et al. | 318/611 |
| 6,033,102 A | * | 3/2000 | Morihira et al. | 366/8 |

(Continued)

*Primary Examiner*—Crystal J Barnes-Bullock
(74) *Attorney, Agent, or Firm*—Foley & Hoag LLP

(57) ABSTRACT

Methods and systems for controlling a cement finishing mill, and operating the mill at an optimal point, are disclosed. To determine an optimal point of operation, values of mill power and sound are collected and compared to values predicted by a model to determine if the mill is choking. This choking determination is used in one of two processes to determine an optimal point of operation for the mill. In the first process, as long as the mill is not choking, the amount of fresh feed input to the mill is incrementally increased; when choking occurs, the amount of fresh feed is decreased until choking ceases. In the second process, the amount of fresh feed input to the mill is increased and decreased in an oscillating manner over time, to find the amount of feed that results in the mill approaching, but never reaching, a choking state.

3 Claims, 3 Drawing Sheets

U.S. PATENT DOCUMENTS 6,383,283 B1 * 5/2002 Doumet ...................... 106/743
6,493,596 B1 * 12/2002 Martin et al. ................. 700/37
2003/0060993 A1 * 3/2003 Russell et al. ................. 702/84
2007/0278333 A1 * 12/2007 Jung et al. .................. 241/241

* cited by examiner

METHODS AND SYSTEMS FOR CEMENT FINISHING MILL CONTROL

CROSS-REFERENCE TO RELATED APPLICATION

The present application claims the benefit of U.S. Provisional Patent Application Ser. No. 60/601,531, which was filed on Aug. 13, 2004, by Alan Morrow, Fayyaz Hussain, Lewis Gordon, and Randy Dwiggins for Methods and Systems for Cement Mill Control, and is hereby incorporated by reference.

BACKGROUND OF THE INVENTION

1. Field of the Invention

The disclosed methods and systems relate generally to cement plant processes, and more particularly to cement plant finish mill control.

2. Background Information

Cement plant finish mills are an integral part of cement plants. As shown in FIG. 1, a typical arrangement has a finish mill 10 that is provided clinker 12 from a cement kiln and external sources, and may optionally be provided fringe (e.g., off specification clinker), limestone, water sprays, and other materials. Gypsum and/or natural anhydrite is added to regulate the setting time of the cement. The finish mill 10 grinds the feed mixture into very small particles 14 that are then fed to a separator 18 via a bucket elevator 16. The separator 18 uses cyclones with variable speed fans or adjustable vanes and/or a variable speed cage rotor to separate the fine product 20 from the larger particles 22 that need to be reground. The larger particles 22 that must be re-ground are fed back into the finish mill 10 as a "reject" or "re-circulating Load" stream, while the fine product 20 is pneumatically conveyed to a collecting cyclone and/or bag filter 24.

The continuous recycling of reject makes process variables in the mill 10 highly interactive and nonlinear, while the large capacity of the mill 10 makes their responsiveness to control corrections very sluggish. Long term variations in feed quality, mill charge, and equipment condition affect both the dynamic and steady-state behavior of these variables, and their stable operating limits. These combined characteristics make stable operation at or very close to the maximum production rate difficult to achieve through conventional control methods.

In a traditional method of cement finish mill ("mill") control, an operator controls the fresh feed addition to the mill, where an underlying control strategy maintains the ratio of feeds (e.g., clinker, gypsum, limestone, fringe, etc.) to the mill in a proper proportion when the fresh feed changes. In such a method, the operator regularly monitors the finish mill (e.g., on a minute by minute basis) and makes the necessary adjustments. Operators thus must adjust the fresh feed input rate to mitigate problems with variations in feed hardness, mill choking, maximum bucket elevator load (e.g., power and/or motor current), cooling water limitations, changes in separator operation, mill loading constraints (e.g., sound and/or power), etc. The operators must also try to maximize the feed rate to improve the profitability of the cement plant. An operator rarely has time to continuously monitor a finish mill, and such a difficult control problem is generally not suited to manual operation/control.

Attempts at correcting the problems of manual operation/control led to the development of automated control systems for mills, where the total amount of feed, including both fresh feed and rejects, was determined by the automated control system 26 with some input from the operator. This method of course requires that a measurement of the reject flow is available. Using the automated system, an operator may establish a target total feed that is equal to the reject flow plus the fresh feed, and the control system adjusts the fresh feed up or down when the reject flow rate changes to maintain the total feed target. Such a system provides for automatic adjusting of mill operation when the feed hardness and/or the separator operation change. For example, if the feed gets harder, the particles exiting the mill are larger and the separator directs more material into the rejects stream. In response, the control system automatically reduces the fresh feed which allows the mill to grind the particles better. Unfortunately, changes in feed hardness, separator operation, and/or total feed target cause moderate to severe oscillations in the response of the finish mill, which is highly undesirable in processing plants and/or other control systems.

Fresh feed oscillation may be understood from an explanation of the process where, using feed hardness as an example, feed hardness changes at time zero minutes such that the mill gradually fills up with harder material and thus does not grind the particles as finely as needed. As a result, coarser material exits the mill to the bucket elevator and is fed to the separator which increases the rejects flow, which causes the control system to reduce the fresh feed. Reducing the fresh feed changes the grindability characteristics of the total feed, and the process repeats.

A variation of this control strategy includes controlling a "demand" that is expressed as a sum of (1) rejects and (2) x*(fresh feed), where x is greater than (1.0). This type of control dampens the oscillations, but provides sub-optimal control.

SUMMARY OF THE INVENTION

In an embodiment of the invention, there is provided a method of controlling a cement finishing mill, where the mill receives both fresh feed and previously processed rejected feed. The method includes measuring the amount of fresh feed and rejected feed entering the mill; predicting the amount of future rejected feed from a model determined from past values of fresh feed, separator operation, and resultant rejected feed; determining a rejected-feed error by determining the difference between the predicted amount of rejected feed and the measured amount of rejected feed; determining mill-control values from a model predictive control application, in which the rejected-feed error is one input variable; and controlling the mill in accordance with the mill-control values.

In another embodiment, there is provided a method of optimizing operation of a cement finishing mill by controlling the amount of fresh feed entering the mill, where the mill receives both fresh feed and previously processed rejected feed. The method includes measuring values of mill power and mill sound in real time; measuring the amount of fresh feed and the operation of a separator over a period of time; making a comparison of mill power and mill sound as predicted from a choking model with the measured values of mill power and mill sound, where the choking model relates mill power and mill sound to the amount of fresh feed and the operation of the separator; using the results of the comparison to determine whether the cement finishing mill is choking; if the choke determination is negative, incrementally increasing the amount of fresh feed input to the mill until the choke determination is affirmative; and determining the optimal amount of fresh feed by incrementally decreasing the amount of fresh feed input to the mill until the choke determination is negative.

In yet another embodiment, there is provided a method of optimizing operation of a cement finishing mill by controlling the amount of fresh feed entering the mill, where the mill receives both fresh feed and previously processed rejected feed. The method includes: measuring values of mill power and mill sound in real time; measuring the amount of fresh feed and the operation of a separator over a period of time; making a comparison of mill power and mill sound as predicted from a choking model with the measured values of mill power and mill sound, where the choking model relates mill power and mill sound to the amount of fresh feed and the operation of the separator; using the results of the comparison to determine whether the cement finishing mill is choking; and determining the optimal amount of fresh feed to be input to the mill by oscillating between increased fresh feed input and decreased fresh feed input until the choke determination approaches affirmative without being affirmative.

BRIEF DESCRIPTION OF THE DRAWINGS

The invention description below refers to the accompanying drawings, of which.

DETAILED DESCRIPTION OF AN ILLUSTRATIVE EMBODIMENT

To provide an overall understanding, certain illustrative embodiments will now be described; however, it will be understood by one of ordinary skill in the art that the systems and methods described herein may be adapted and modified to provide systems and methods for other suitable applications and that other additions and modifications may be made without departing from the scope of the systems and methods described herein.

Unless otherwise specified, the illustrated embodiments may be understood as providing exemplary features of varying detail of certain embodiments, and therefore, unless otherwise specified, features, components, modules, and/or aspects of the illustrations may be otherwise combined, separated, interchanged, and/or rearranged without departing from the invention. Additionally, the shapes and sizes of components are also exemplary and unless otherwise specified, may be altered without departing from is the invention.

Figure 1:
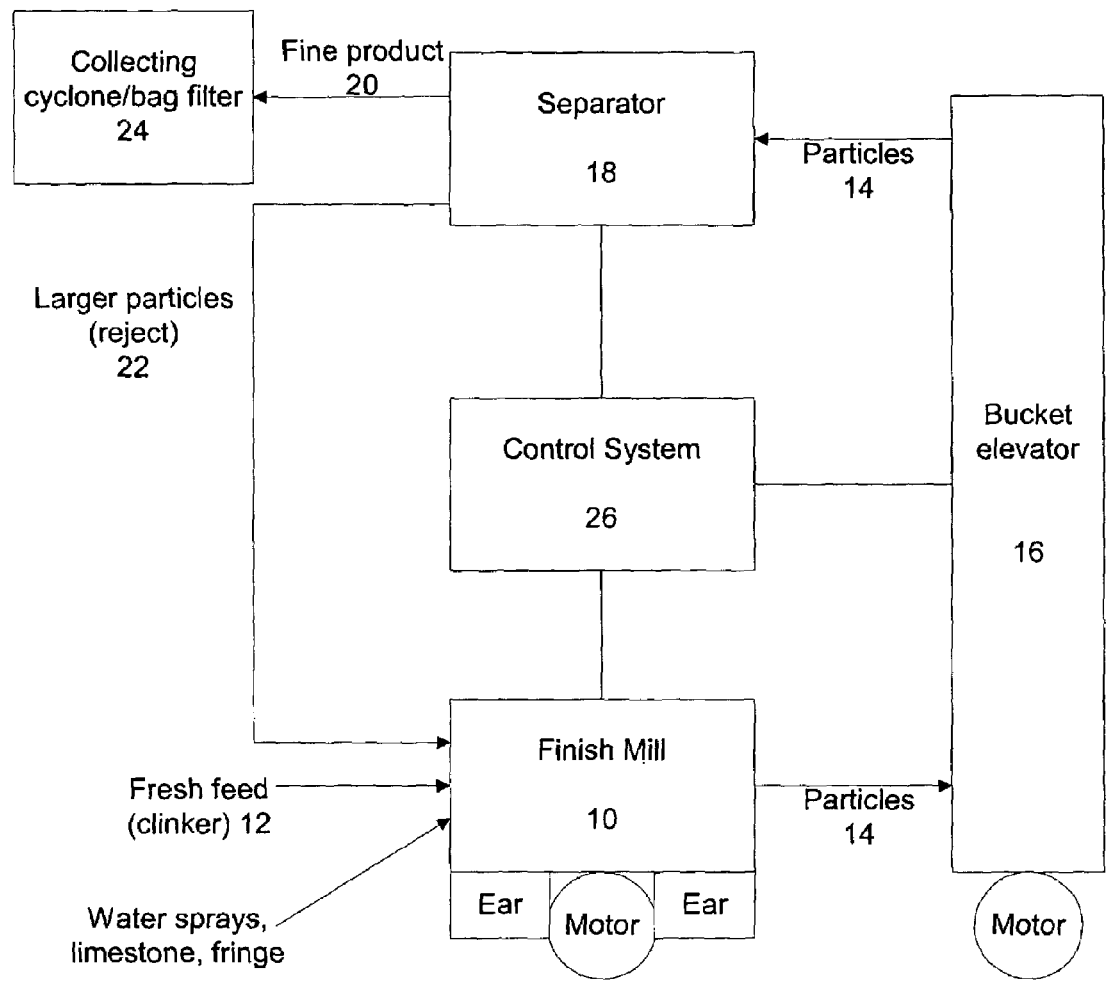
FIG. 1 is shows a design of a type of cement finish mill in which the present invention may be practiced.

The disclosed methods and systems increase the feed rate to a finish mill, such as the finish mill 10 shown in FIG. 1, while maintaining product quality and operating the mill within limits set by plant production personnel and equipment capability. In the illustrated embodiment, the disclosed methods and systems employ the CONNOISSEUR advanced process control software application developed and sold by Invensys, Inc., however the disclosed methods and systems are not limited to such control software, and such example is provided for illustration and not limitation. The example embodiments also employ a Model Predictive Control (MPC) technology that may use expert system rules, where the MPC is part of the control system 26.

The MPC application includes manipulated variables (e.g., automatically adjusted), controlled variables (e.g., measurements that are either kept within a constraint or at a target set point), and feedforward variables (e.g., uncontrolled process measurements and/or calculations). Controlled variables are dependent variables because they are dependent upon manipulated variables such that when a manipulated variable is changed, such a change will cause a change to one or more controlled variables. The manipulated and feedforward variables are independent variables.

The MPC application contains a model that relates the independent variables (manipulated and feed forward variables) to the dependent (controlled) variables. In one embodiment, the type of model is known as an ARX model (Auto-Regressive with exogenous inputs). It can be understood that although the independent and dependant variables in the model are generally the same for different finish mills, the coefficients in the model may be unique to a finish mill (e.g., coefficients determined by fitting data from the mill to the model using a fitting technique such as a Least Squares technique, etc.).

MPC application variables may include: total fresh feed to the mill (a manipulated variable); bucket elevator load, measured by weight or power (a setpoint determined by an optimization search, provided that no constraints are violated); bucket elevator motor current (an optional constraint); mill power (a constraint); mill sound in chamber one (an optional constraint); mill sound in chamber two (an optional constraint); cooling water valve position and/or mill air temperature (optional constraints); separator fan speed fans or vane position and/or cage rotor speed (feedforward or manipulated based on operator-entered target); and measurement of the reject.

The reject measurement is correlated to the amount of fresh feed provided to the mill, which is manipulated by the MPC application. Accordingly, when the rejects measurement is used as a feed forward variable, the mill process values will oscillate. To solve this problem, in FIG. 1 an embodiment of the invention provides the MPC application of the control system 26 with a residual model error signal instead of the measurement of the reject 22. The MPC application determines the residual model error, or rejected-feed error, by using a model of the reject flow that is based on the independent variables of fresh feed amount and separator operation. The MPC application uses this model in real time to predict the flow of the reject 22 based on past values of the amount of fresh feed 12 and separator 18 operation, and taking the difference of the measured flow and the predicted flow, such that Rejected-Feed Error=$\text{Reject}_{Measured}-\text{Reject}_{Predicted}$. The rejected-feed error will indicate changes in grinding efficiency. For example, if the rate of fresh feed 12 is constant yet its characteristics change and the feed is harder to grind, then the flow of reject 22 will increase unexpectedly, which is a positive error. This error may be due, in part or entirely, to a change in the hardness of the fresh feed 22, and may not be correlated with any changes in the rate of the fresh feed 22 and/or the operation of the separator 18. The MPC application 40 uses the rejected-feed error signal as a feedforward variable.

In another embodiment of the invention, there are provided methods and systems to optimize the operating point of a cement finish mill for maximum throughput and reduced energy input per unit of cement product, while maintaining controllability of the mill and avoiding mill choking. Such an operational point may vary over time, and thus the disclosed methods and systems compensate for liner wear, long term variations in ball loading, product changes, instrumentation drift, and other similar changes to the mill and its operating environment.

Mill choking occurs when there is too much inventory in the finish mill. The finish mill is unable to properly grind the feed, and hence the reject rate increases and the mill and transport lines physically fill up. The disclosed methods and systems detect mill choking by examining mill power, bucket elevator load, and mill sound. If mill choking is detected, the methods and systems may automatically reduce feed to safeguard mill operation. Additionally, the point at which mill choking occurs may be used to determine the optimal operating point of the mill, as described below.

Figure 2A:
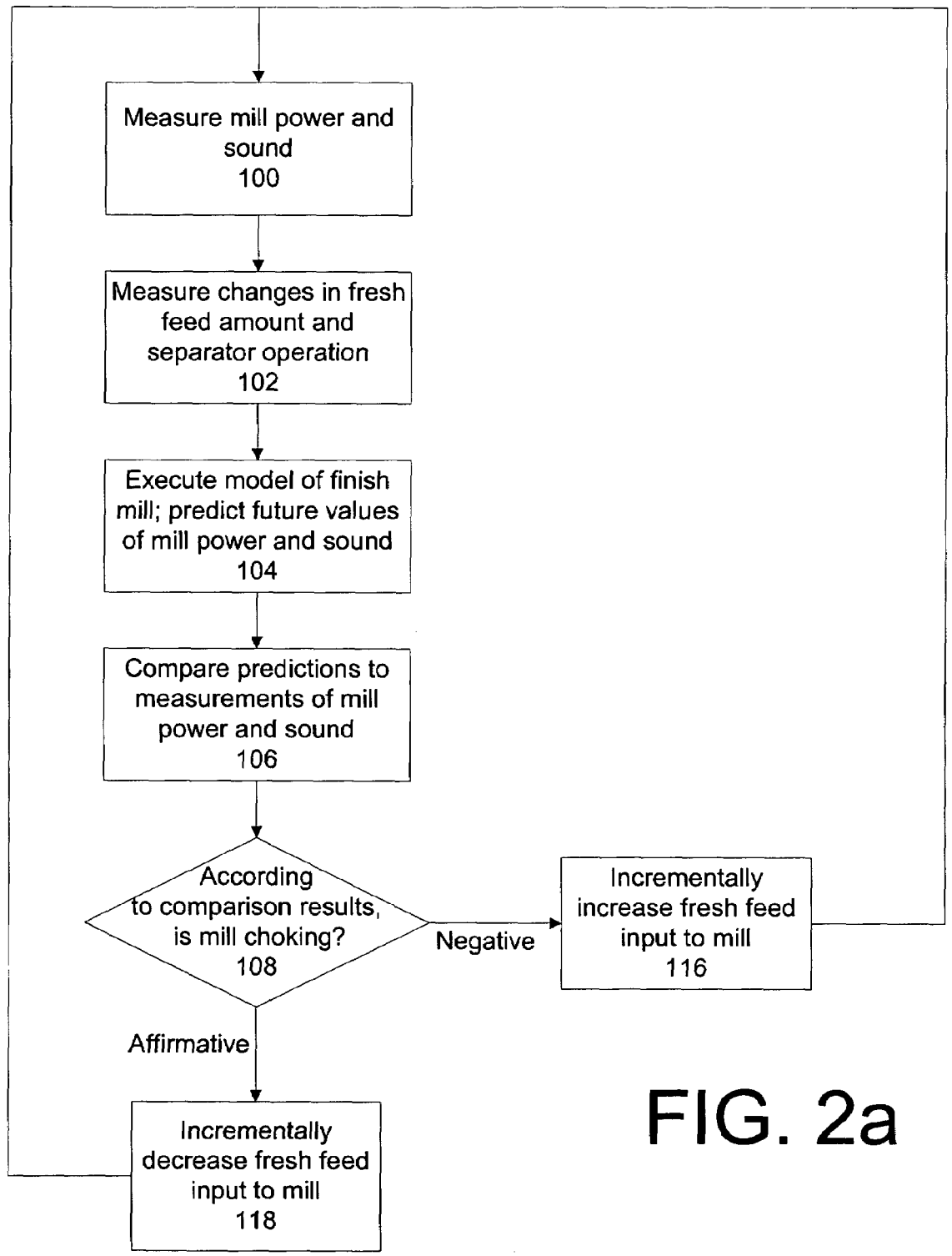
FIG. 2a and FIG. 2b are flowcharts of processes for determining an optimal operating point for a cement mill.
Figure 2B:
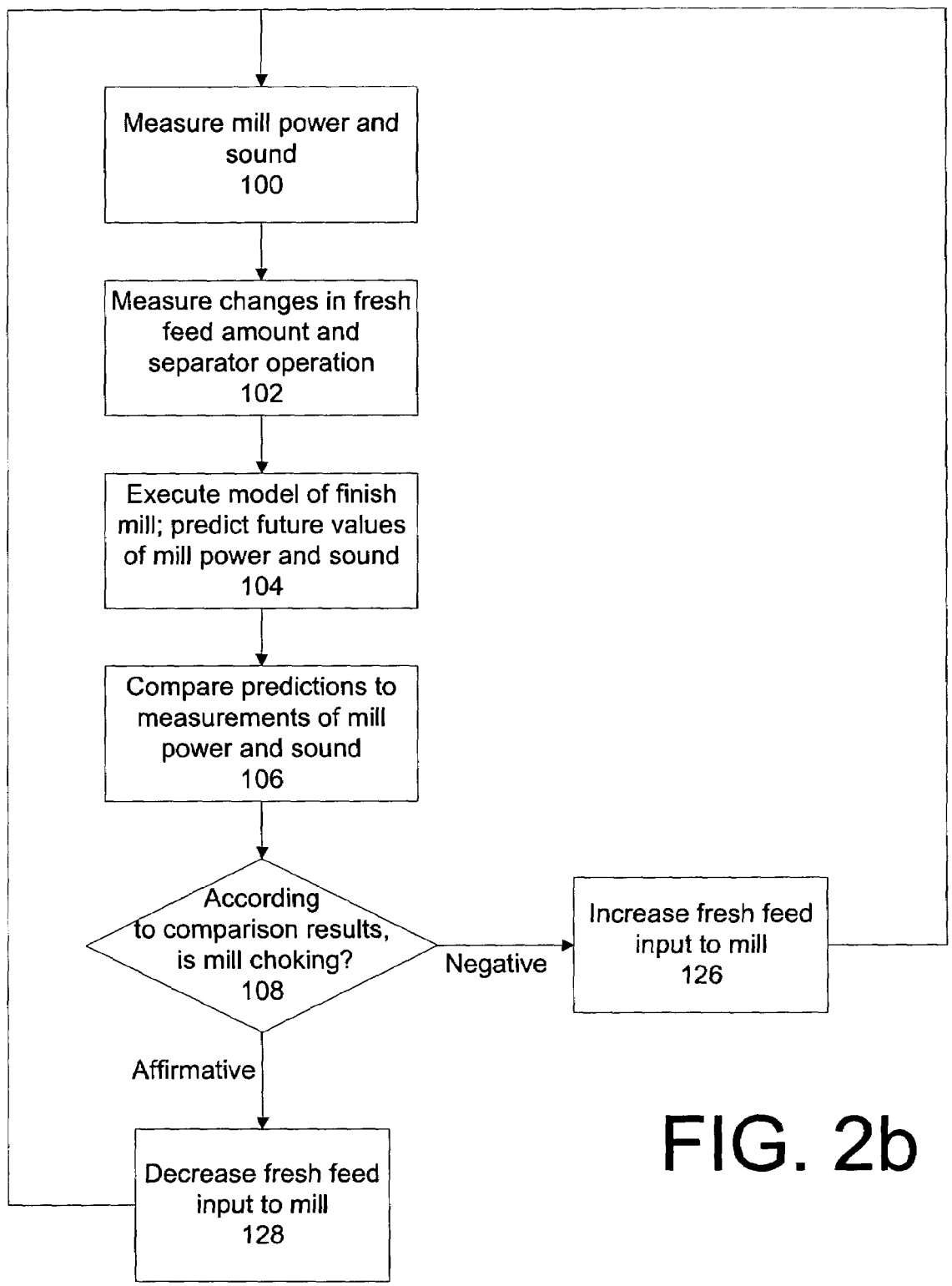

As shown in FIGS. 2a and 2b, the disclosed methods and systems employ a supplemental model of a cement finish mill to predict future values of mill power and sound based on past adjustments in the fresh feed and the operation of the separator. If the mill power and sound drop significantly for unknown cause, then the mill is declared to be choked. As the mill operates, the mill control system measures values of mill power and mill sound 100 as well as measuring the amount of fresh feed and the operation of the separator 102. The mill control system then executes a model of the finish mill 104, where the model relates mill power and mill sound to the amount of fresh feed and the operation of the separator. The mill control system next compares 106 the predictions of the choking model to the actual mill power and sound values to produce an error vector that may be expressed as:

(Error)=(Predicted_Value)−(Process_Value). The results of the comparison are then used to determine if the mill is choking 108. The derivative of the error vector with respect to time is determined; the result will be either positive or negative, which will indicate the direction in which the error is heading. The mill may be determined to be in a choked condition if one of the following two conditions is true: the value of the mill power and/or sound are beyond their limits (e.g., respective thresholds) for a predetermined period of time, and/or the average error of the mill power and/or sound are beyond their limits for a predetermined period of time. If the mill is choked and the mill control system is on and manipulating the amount of fresh feed input to the mill, then the bucket elevator load setpoint and/or the fresh feed setpoint may be automatically reduced.

Physical factors such as liner wear and ball charge change slowly as does instrumentation drift. The disclosed mill controller compensates for these longer term variations to ensure that the mill is operating at its optimum point. Accordingly, the methods and systems employ one or more processes to identify the optimum operating point as a function of time.

In a first process as shown in FIG. 2a, the determination of whether choking is occurring (steps 102-108) determines the next action of the control system. If the choke determination (steps 102-108) is negative, the control system incrementally increases 116 the amount of fresh feed that is input to the mill. The choke determination (steps 102-108) is then repeated until the choke determination is affirmative. When the choke determination (steps 102-108) is affirmative, the control system incrementally decreases 118 the amount of fresh feed input to the mill until the choke determination (steps 102-108) is again negative. This process results in the mill operating at a point as close to the point of incipient choking as possible. Of course, as the point of incipient choking may change over time, the first process may be repeated at later times to determine if the current amount of fresh feed being input to the mill may be increased without causing choking, or decreased if choking occurs at the current input amount.

In a second process as shown in FIG. 2b, the determination of whether choking is occurring (steps 102-108) again determines the next action of the control system. For as long as the choke determination (steps 102-108) is negative, the amount of fresh feed input to the mill is increased 126 by any amount, until the choke determination (steps 102-108) is affirmative. At that point, the amount of fresh feed input to the mill is decreased 128 by any amount, with the amount of fresh feed input to the mill further decreasing until the choke determination (steps 102-108) is negative. This oscillation between increased fresh feed input and decreased fresh feed input is repeated until the choke determination (steps 102-108) approaches affirmative without being affirmative. This process also results in the mill operating at a point as close to the point of incipient choking as possible. Again, as the point of incipient choking may change over time, the second process may be used repeatedly to determine if more or less fresh feed is needed to operate the mill at the point just before choking becomes incipient. Either the first process or the second process may be used to achieve an optimal operating point for a mill; the choice of process is dependent on how well a mill responds to that process being used to achieve optimal operation of that mill.

In a third process (not shown), the methods and systems use a combination of an online adaptor and small scheduled perturbations in bucket elevator set point to identify the process gain values on a scheduled basis. The perturbations in the bucket elevator setpoint will have an amplitude of 2-5 times the noise band in the bucket elevator measurement. The total length of the perturbations will be approximately two times to steady state. This perturbation generates information rich data that is passed to the adaptor which can new coefficients to its model and hence calculates a new process gain. Depending on the gain value determined, the system will increase or decrease the bucket elevator load set point accordingly. The amount of increase or decrease to the bucket elevator load set point is a function of/based on the finish mill model. In embodiments, each finish mill can be described by its own model that is generated from plant data.

The methods and systems thus include checking for mill choking condition, and controlling such condition as provided herein; otherwise, determining a ratio R of the baseline bucket elevator load to feed ratio to the current bucket elevator load to feed ratio where the baseline conditions were determined during the original finish mill installation and testing, where $$R=[(\text{Current\_Bkt\_Elv\_Load}/\text{Current\_Fresh\_Feed})/(\text{Baseline\_Bkt\_Elv\_Load}/\text{Baseline\_Fresh\_Feed})]$$

In the illustrated embodiments which use CONNOISSEUR, the CONNOISSEUR MPC application may make automatic changes to its model based on the parameter R. The effect of a small movement in fresh feed rate on the mill bucket elevator load, power, and sound will be amplified (compared to the baseline) when R>1; therefore, that adjustment is made to the MPC application models by multiplying by R.

Use of the terms maximum, minimum, and/or optimum herein may be understood to related and relevant to the context in which the terms are used (e.g., based on the parameters and/or other factors associated with the quantity being maximized, minimized, and/or optimized), and may be understood to be based on the embodiment. These terms are thus not absolute terms and should be construed within the context in which they are used.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single or multiple processor/devices.

The device(s) or computer systems that integrate with the processor(s) may include, for example, a personal computer(s), workstation (e.g., Sun, HP), personal digital assistant (PDA), handheld device such as cellular telephone, laptop, handheld, or another device capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus may be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be 10 contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for is illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art. Accordingly, it will be understood that the described embodiments are not to be limited to the embodiments disclosed herein, may include practices otherwise than specifically described, and are to be interpreted as broadly as allowed under the law.

What is claimed is:

1. A method of controlling a cement finishing mill, where the mill receives both fresh feed and previously processed rejected feed, the method comprising:
    measuring the amount of fresh feed and rejected feed entering the mill;
    predicting the amount of future rejected feed from a model determined from past values of fresh feed, separator operation, and resultant rejected feed;
    determining a rejected-feed error by determining the difference between the predicted amount of rejected feed and the measured amount of rejected feed;
    determining mill-control values from a model predictive control application, in which the rejected-feed error is one input variable; and
    controlling the mill in accordance with the mill-control values.

2. A method of optimizing operation of a cement finishing mill by controlling the amount of fresh feed entering the mill, where the mill receives both fresh feed and previously processed rejected feed, the method comprising:
    measuring values of mill power and mill sound in real time;
    measuring the amount of fresh feed and the operation of a separator over a period of time;

using a choking model which relates mill power and mill sound to the amount of fresh feed and the operation of the separator, predicting the values of mill power and mill sound;

based upon at least one of the following conditions being satisfied:
   i) the measured mill power and/or mill sound fall short of the predicted mill power and/or mill sound by more than a predetermined amount for a predetermined period of time; or
   ii) the measured mill power and/or mill sound fall short of the predicted mill power and/or mill sound by more than a predetermined amount; or
   iii) the measured mill power and/or mill sound is below a predetermined threshold for a predetermined time; or
   iv) the measured mill power and/or mill sound drops by more than a predetermined amount during a predetermined time;

determining that the cement finishing mill is choking;

if the choke determination is negative, incrementally increasing the amount of fresh feed input to the mill until the choke determination is affirmative; and determining the optimal amount of fresh feed by incrementally decreasing the amount of fresh feed input to the mill until the choke determination is negative.

3. A method of optimizing operation of a cement finishing mill by controlling the amount of fresh feed entering the mill, where the mill receives both fresh feed and previously processed rejected feed, the method comprising:

measuring values of mill power and mill sound in real time;

measuring the amount of fresh feed and the operation of a separator over a period of time;

using a choking model which relates mill power and mill sound to the amount of fresh feed and the operation of the separator, predicting the values of mill power and mill sound;

based upon at least one of the following conditions being satisfied:
   i) the measured mill power and/or mill sound fall short of the predicted mill power and/or mill sound by more than a predetermined amount for a predetermined period of time; or
   ii) the measured mill power and/or mill sound fall short of the predicted mill power and/or mill sound by more than a predetermined amount; or
   iii) the measured mill power and/or mill sound is below a predetermined threshold for a predetermined time; or
   iv) the measured mill power and/or mill sound drops by more than a predetermined amount during a predetermined time;

determining that the cement finishing mill is choking;

determining the optimal amount of fresh feed to be input to the mill by oscillating between increased fresh feed input and decreased fresh feed input until the choke determination approaches affirmative without being affirmative.

* * * * *